Aug. 18, 1936.  L. PACHNER ET AL  2,051,651
FISHHOOK
Filed Dec. 21, 1935
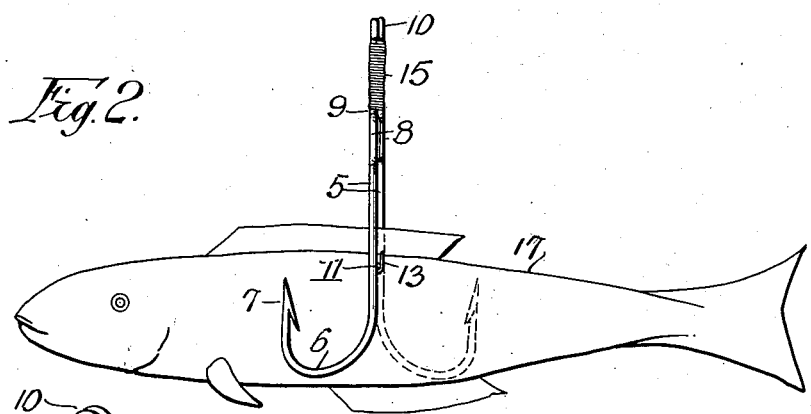
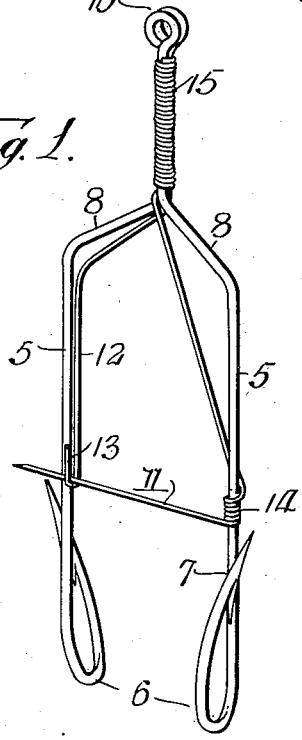
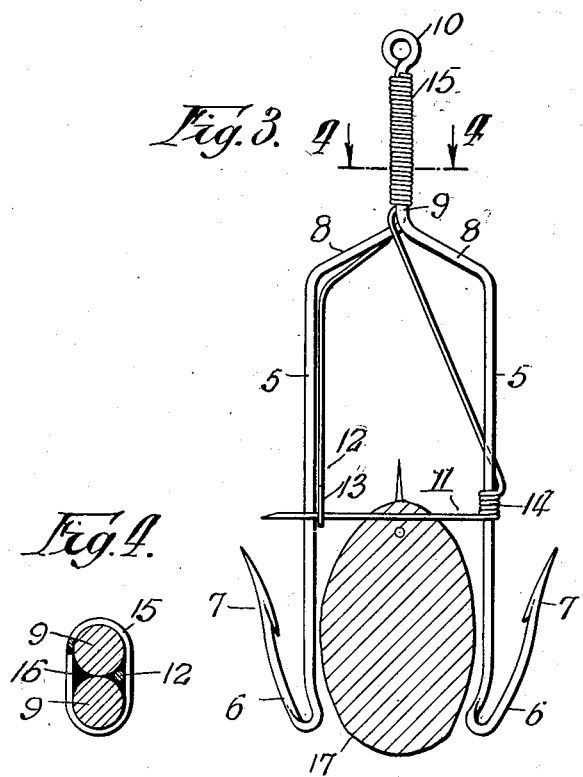
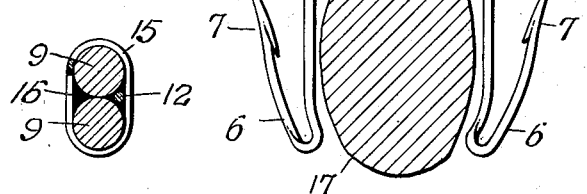
Inventors:
Leo Pachner and Fred Moller,
Witness:
E. Camporini Patented Aug. 18, 1936

2,051,651

UNITED STATES PATENT OFFICE 2,051,651

FISHHOOK

Leo Pachner and Fred Koller, Chicago, Ill.

Application December 21, 1935, Serial No. 55,508

7 Claims. (Cl. 43—40)

This invention relates to improvements in fishhooks and it consists of the matters hereinafter described and more particularly pointed out in the appended claims.

One of the objects of the invention is to provide a fishhook by which live bait, such for example as a minnow, may be firmly held without injury, yet may have entire freedom of movement in the water so as to be attractive to fish and thus facilitate the catching thereof.

Another object of the invention is to provide a hook which has duplex shanks and which includes a transverse impaling pin made as the extension of a piece of wire coiled about one shank for a spring action, the same being adapted to be releasably locked with respect to the other shank by engagement with a spring catch associated therewith.

A further object of the invention is to provide a hook of this kind which is easy and practical to make at a relatively low cost.

The above mentioned objects of the invention, as well as others, together with the several advantages thereof will more fully appear as we proceed with our specification.

In the drawing:

Fig. 1 is a perspective view on an enlarged scale of a fishhook embodying the preferred form of the invention.

Fig. 2 is a view in side elevation thereof in connection with an associated live bait, such as a live minnow.

Fig. 3 is a view in front elevation of the improved hook, the bait appearing in cross section.

Fig. 4 is a transverse detail section through the neck part of the hook on a further enlarged scale as taken on the line 4—4 of Fig. 3.

Referring now in detail to that embodiment of the invention, illustrated in the accompanying drawing:

5—5 indicates a pair of laterally spaced, straight shanks each having a curved bottom end 6 that terminates in a pointed and barbed extremity 7. The curved bottom ends 6 of the shanks face in opposite direction, longitudinally of the bait to be used.

The other or top end of each shank is offset laterally as at 8 and merges into a shank extension 9 that terminates in an eye 10. The two extensions 9—9 of the shanks are arranged to engage with each other to form a neck and so that the eyes 10 align to form an attachment loop for the usual leader (not shown) of the line used in fishing.

11 indicates the impaling pin of the hook and 12 indicates the retaining catch therefor. The catch 12 is made from a piece of spring wire, the bottom portion of which extends upwardly along the inside of one of the shanks. The bottom extremity of said portion is bent back upon itself to form a catch hook 13. The piece of wire from which the catch is made, has a bend therein to follow the offset 8 of the associated shank. The top portion of said piece of wire is arranged in the groove of the neck as afforded by one side of the extensions 9 of both shanks and is secured in position as will soon appear.

The impaling pin 11 is made from one end of a piece of spring wire, the intermediate portion of which is wound about the other shank 5 as a helix 14. The other end of this piece of wire leads up to the neck as formed by the extensions 9 of both shanks to be wound thereon as a helix 15 that terminates at the eyes 10—10. The helix 15 is wound substantially tight upon said neck and encloses the same along with the top portion of the wire forming the catch 12 and which lies in the groove in the neck as afforded by the engagement of said extensions. After this helix 15 has been made, solder 16 is flowed thereabout as shown in Fig. 4 to hold the parts securely together. Thus the shanks cannot turn relatively nor can the wire from which the catch is made, pull out from under said helix.

The impaling pin 11 itself is of such length as to span the space between the shanks 5—5 and extends some distance beyond the catch hook 13 as appears in Fig. 1. The impaling pin, may be flexed upwardly or downwardly from the helix 14 and may be flexed away from that shank with which the catch is associated. Thus the impaling pin is capable of universal movement manually, and when released will snap back against the last mentioned shank.

The spacing between the shanks is such as to receive the desired live bait, which is shown herein as a minnow 17. In baiting the hook, the impaling pin is released from the catch hook 13 and is swung outwardly so that it may be inserted transversely through the back of the minnow about midway between its ends and just under the dorsal fin thereof. When the pin is released, it snaps back toward the catch hook and may then be sprung upwardly so as to engage therein. This holds the pin in relatively close engagement with the shank.

When the pin is inserted through the minnow and is locked in position by the catch, the minnow is so positioned between the shanks as to permit a free swimming movement so as to be attractive as a bait, but it cannot escape.

As the minnow is not sensitive at the point through which the impaling pin extends, for all practical purposes it is uninjured and will have a relatively long period of usefulness as a bait, unless taken by a fish. As the curved ends 6 of the shanks face in the opposite direction lengthwise of the minnow, a catch is assured whether the fish strikes from the front, rear or either side of the minnow.

While the wire from which the catch 12 is made is springy, so that it may "give", with a movement of the impaling pin, the "give" is not of such extent as will permit escape of the minnow. Just as soon as the "give" is released, the catch hook 13 and the impaling pin will return to normal position. If it is desired to remove the bait for any purpose, the pin 11 is moved out of the catch hook and is then swung away therefrom when the bait may be slid off the pin.

While we have mentioned a minnow as a live bait, other live bait may be used. Also, cut bait may be used as the same may be easily impaled upon the pin.

While in describing the invention, we have referred in detail to the form, arrangement and construction of the various parts thereof, the same is to be considered only in the illustrative sense so that we do not wish to be limited thereto except as may be specifically pointed out in the appended claims.

We claim as our invention:

1. A fishhook embodying therein a pair of laterally spaced shanks having neck portions, wire means, an intermediate portion thereof being wound about a part of one of said shanks and an end portion thereof being secured to said neck, another end portion of said wire means projecting from said wound portion to provide an impaling pin.

2. A fishhook comprising a pair of laterally spaced shanks, having portions at one end to provide a neck and to form a line attaching eye, and a piece of wire having an intermediate portion wound helically about a mid-portion of one of said shanks and having one end forming an impaling pin normally engaged with the mid-portion of the other shank, the other end of said wire being secured to said neck.

3. A fishhook comprising a pair of hook members, each having a shank and a portion offset therefrom and at least one of which terminates in an eye, said offset portions being engaged to form a neck, a piece of wire having an intermediate portion wound about the mid-portion of one of said shanks and having one end forming an impaling pin normally engaged against the mid-portion of the other shank, the other end of said wire being wound about and secured to said neck.

4. A fishhook comprising a pair of laterally spaced shanks having portions at one end to provide a neck and to form a line attaching eye, a piece of wire having an intermediate portion wound helically about a mid-portion of one of said shanks and having one end forming an impaling pin normally engaging the mid-portion of the other shank, the other end of wire being secured to said neck, and means associated with said mid-portion of said other shank to provide a catch for the impaling pin.

5. A fishhook comprising a pair of laterally spaced shanks having portions at one end to provide a neck and to form a line attaching eye, a piece of wire having an intermediate portion wound helically about a mid-portion of one of said shanks and having one end forming an impaling pin normally engaging the mid-portion of the other shank, the other end of said wire being secured to said neck, and a flexible member secured at one end to said neck and having a bent loop at the other end arranged adjacent said mid-portion of said other shank to form a catch for the impaling pin.

6. A fishhook comprising a pair of hook members each having a shank and a portion offset therefrom and at least one of which portions terminates in an eye, said offset portions being engaged to form a neck, a piece of wire having an intermediate portion wound about the mid-portion of one of said shanks and having one end forming an impaling pin normally engaged against the mid-portion of the other shank, and a second piece of wire having an end engaged with the offset portions of both shanks forming said neck and provided at the other end with a catch for the impaling pin, the other end of said first mentioned piece of wire being wound about and enclosing said neck and that part of said second piece of wire engaged therewith.

7. A fishhook comprising a pair of separate hook members, each having a shank and an offset portion that terminates in an eye, said offset portion being engaged side by side to form a neck and so that said eyes coincide, a piece of wire having an intermediate portion helically wound about one shank and having one end formed as an impaling pin to normally engage the mid-portion of the other shank, a second piece of wire having one end engaged with said offset portions of both shanks forming said neck and having its other end bent to form a catch for the impaling pin, the other end of the first mentioned piece of wire being wound about and having a soldered connection with said neck and that part of said second piece of wire engaged therewith.

LEO PACHNER.
FRED KOLLER.